United States Patent [19]

Herring et al.

[11] Patent Number: 5,031,346
[45] Date of Patent: Jul. 16, 1991

[54] JUKEBOX SELECTION DISPLAY AND PAGE TURNING MECHANISM THEREFOR

[75] Inventors: Lloyd D. Herring, Rockford; Robert J. Elshof, Grand Haven; Richard Van Dyk, Kentwood; Jeffrey J. Kalis, Grand Rapids, all of Mich.

[73] Assignee: Rowe International, Inc., Whippany, N.J.

[21] Appl. No.: 384,733

[22] Filed: Jul. 24, 1989

[51] Int. Cl.⁵ ............................................. G09F 11/02
[52] U.S. Cl. .................................. 40/463; 40/475; 40/510; 369/34
[58] Field of Search ............... 40/475, 531, 389, 471, 40/463, 510, 470, 466, 509, 510; 369/34; 312/193, 223, 234.1; 340/825.25

[56] References Cited

U.S. PATENT DOCUMENTS

| | | | |
|---|---|---|---|
| 1,618,718 | 2/1927 | Lees | 40/531 |
| 3,043,597 | 7/1962 | Rockola | 369/34 |
| 3,147,838 | 9/1964 | Mueller et al. | |
| 3,205,030 | 9/1965 | Senechal | 40/463 |
| 3,268,868 | 8/1966 | Rockola | 40/389 |
| 3,412,496 | 11/1968 | Hendricks et al. | 40/389 |
| 3,961,433 | 6/1976 | D'Cruz et al. | 40/471 |
| 4,258,838 | 3/1981 | Rockola et al. | 369/34 |
| 4,719,712 | 1/1988 | Moreau et al. | 40/531 |
| 4,831,758 | 5/1989 | Williams et al. | 40/389 |

FOREIGN PATENT DOCUMENTS

| | | |
|---|---|---|
| 1023019 | 3/1966 | United Kingdom . |
| 2016789 | 9/1979 | United Kingdom . |
| 2170943 | 8/1986 | United Kingdom . |

*Primary Examiner*—Kenneth J. Dorner
*Assistant Examiner*—J. Hakomaki
*Attorney, Agent, or Firm*—Shenier & O'Connor

[57] ABSTRACT

A title display system for an automatic phonograph in which two sets of large panels, each side of which is adapted to carry three CD jackets, are arranged side by side in a recess in the front of the machine cabinet for concomitant pivotal movement of the panels inwardly or outwardly. A panel moving control system may be set in a first mode in which the panels are moved periodically to attract attention or in a second mode in which the panels are returned to positions at which predetermined pages are in view in the quiescent condition of the phonograph.

27 Claims, 8 Drawing Sheets

JUKEBOX SELECTION DISPLAY AND PAGE TURNING MECHANISM THEREFOR

FIELD OF THE INVENTION

The invention relates to jukeboxes and, more particularly to a jukebox selection display system and page turning mechanism therefor.

BACKGROUND OF THE INVENTION

In jukeboxes of the type known in the prior art, the front of the cabinet provides a relatively large display area in which the titles and artists of the available selections are listed. These displays are stationary with no pictorial material.

There are also known in the prior art remote selection units which generally are wall-mounted. A unit of this type houses a plurality of relatively small pivoted pages, each of which contains the title and artist information for a number of selections. Any suitable mechanism is provided for turning the pages manually. Examples of such units are shown in U.S. Pat. No. 3,268,868 and Pat. No. 3,412, 496.

While displays of the type described above adequately convey the information relating to the available selections, they do not attract the customer's attention either to the jukebox itself or to the selections.

We conceived an improved jukebox selection display system in which a plurality of large pages mounted in a recess in the jukebox cabinet carry not only information relating to titles and performers but also pictorial information and which may be operated automatically in such a way as to invite attention to the jukebox itself or to the display on a particular page.

SUMMARY OF THE INVENTION

One object of our invention is to provide an improved jukebox selection display system made up of a number of relatively large pages visible from the front of the jukebox and containing pictorial displays as well as descriptive information in alphanumeric form.

Another object of our invention is to provide an improved page turning mechanism which generates sufficient torque to turn relatively large pages while at the same time not requiring an excessive distance between adjacent page pivots.

Yet another object of our invention is to provide an improved jukebox selection display system which may be operated in an automatic page turning mode which attracts attention to the jukebox itself.

A further object of our invention is to provide an improved jukebox display system which may be operated in a mode in which it always returns to display a particular page in the quiescent state.

Another object of our invention is to provide an improved selection display system for a jukebox which is especially adapted to play compact discs.

Still another object of our invention is to provide an improved selection display system for a jukebox in which each page of the display is large enough to display three compact disc jackets.

A still further object of our invention is to provide an improved selection display system for a jukebox which is attention getting and interest arousing.

Still another object of our invention is to provide an improved page turning mechanism for a jukebox display system which is relatively simple for the result achieved thereby.

Yet another object of our invention is to provide an improved page turning mechanism for a jukebox display system which occupies a relatively small space for the torque generated thereby.

Other and further objects of our invention will appear from the following description.

BRIEF DESCRIPTION OF THE DRAWINGS

In the accompanying drawings to which reference is made in the instant specification and which are to be read in conjunction therewith and in which like reference characters are used to indicate like parts in the various views.

DESCRIPTION OF THE PREFERRED EMBODIMENT

Figure 1:
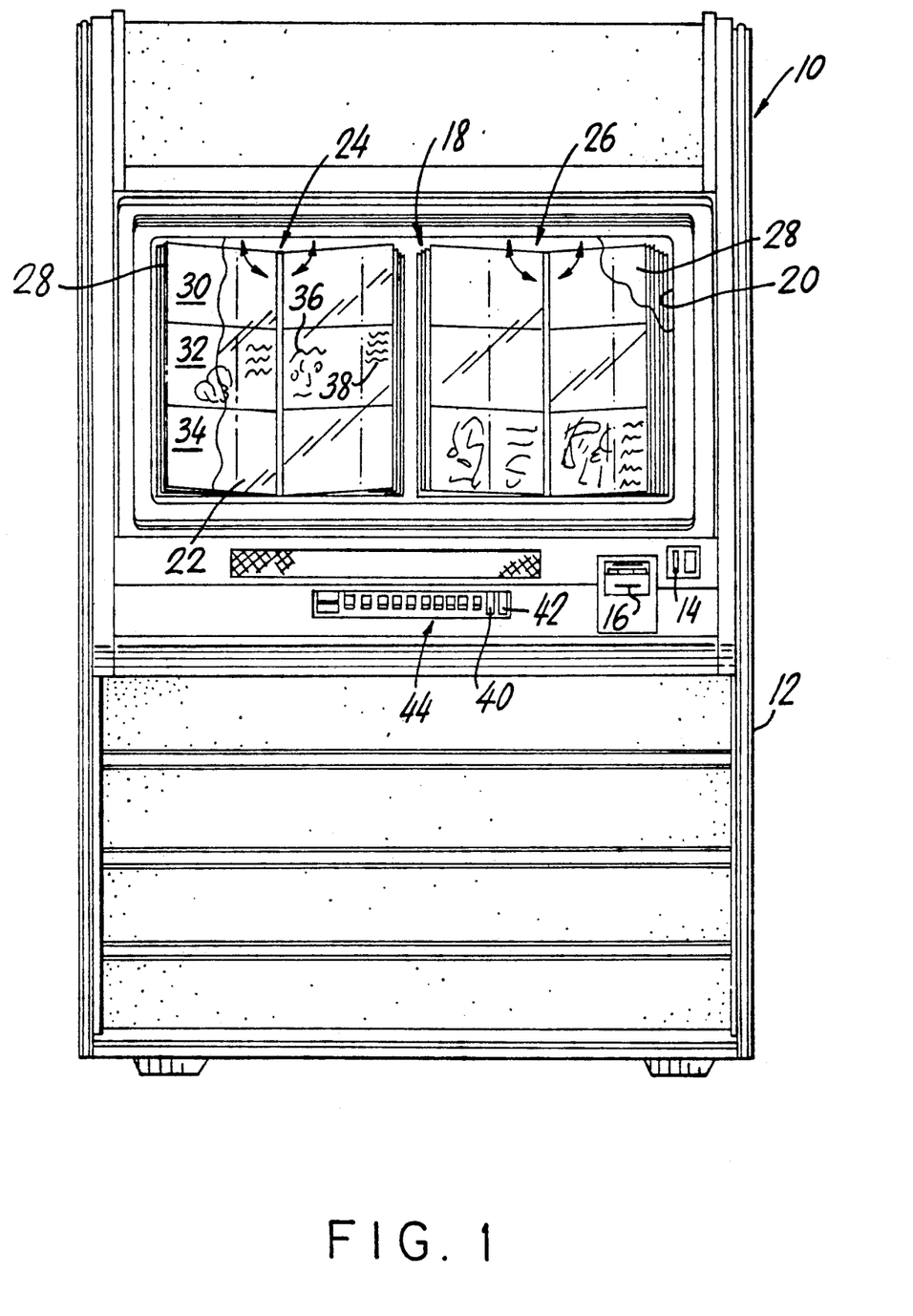
FIG. 1 is a front elevation of a jukebox provided with our improved selection display system and page turning mechanism therefor.

Referring now to FIG. 1, a jukebox indicated generally by the reference character 10 which is equipped with our improved selection display system and page turning mechanism includes a cabinet 12, a coin slot 14, and a bill acceptor mechanism 16 accessible at the front of the cabinet to permit the deposit of money prior to making a selection. The cabinet front has a display area indicated generally by the reference character 18 in front of a recess 20 covered by a window 22. We mount respective groups indicated by the reference characters 24, 26 of selection page panels 28 within the recess 20 behind the window 22.

Each side of each panel 28 may, for example, include three displays 30, 32 and 34. In the preferred embodiment of our system each of the displays 30, 32 and 34 is made up of a compact disc jacket including a pictorial representation 36 and descriptive material 38. In the preferred embodiment the outer sides of the outer panels 28 of each group 24 and 26 carry no displays and as will be described, these outer sides are never exposed to view. In any condition of the display twelve selections can be viewed.

As will be described more fully hereinbelow, each of the panels 28 is supported for pivotal movement around an axis located generally centrally of its group 24 or 26. Moreover, as will be apparent from the showing of FIG. 1, each axis is generally vertical but is tilted slightly rearwardly from bottom to top so that gravity assists in completing the turning movement of a panel, in a manner to be described.

Since the two groups 24 and 26 are substantially identical, only the right hand group 26 will be described in detail. Referring now to FIGS. 2 to 6, group 26 includes nine page-forming panels 28a to 28i, the opposite sides of each of which, save for the outboard panel 28a and 28i, carry displays. Only the inner sides of the panel 28a and 28i, carry displays.

The jukebox 10 includes an upper frame member 46 and a lower frame member 48 provided with holes for receiving an upper pivot pin 50 and a lower pivot pin 52 carried by each panel, thus to support the panel for pivotal movement.

The recess 20 behind the window 22 is formed by an enclosure made up of a right side wall 54 having a rearwardly inclined portion 56 making an angle of approximately 45° with the wall 54. Those panels 18a to 18c which have been turned so that they are to the right of the display as viewed from the front, rest against the portion 56. A central wall 58 of the enclosure has a left-hand rearwardly inclined portion 60 and a right-hand rearwardly inclined portion 62 against which those panels to the left of the center of the display 26 rest.

The upper inner corner of each of the panels 18a to 18i receives a respective clip 64a to 64i. Each clip 64 has an upper rearwardly extending tooth 66 at one side of the associated panel and a lower rearwardly extending tooth 68 at the other side of the panel.

We provide our page turning apparatus with drive means for engaging the teeth of the clips 64 to turn the panels 18 to change the selection display. More specifically, we provide a left-hand drive bar 70 associated with the left-hand group 24 and a right-hand drive bar 72 associated with the right-hand group 26. Since the two bars and their associated structures are substantially the same, we will describe in detail only the structure associated with the drive bar 72. Bar 72 is supported for sliding movement relative to the group 26 of panels by a supporting flange 74 on a frame member 76. A rear guide member 78 carried by the underside of frame member 46 is provided with a plurality of upper retainer tabs 80 which guide the bar 72 in its movement.

Figure 4:
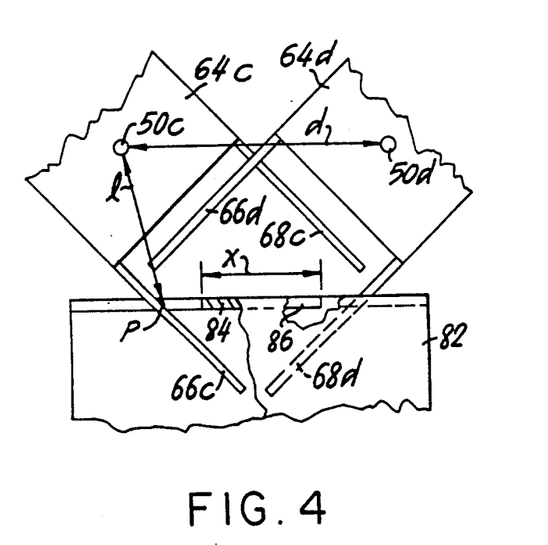
FIG. 4 is a fragmentary view of a portion of the page turning mechanism drawn on an enlarged scale.
Figure 5:
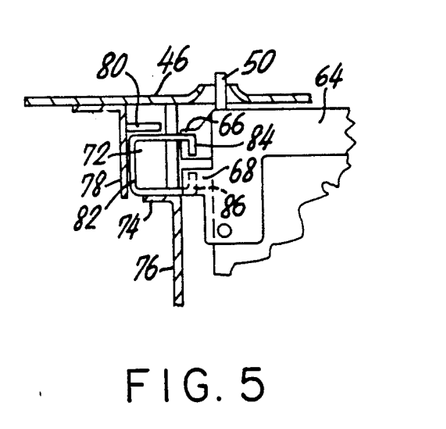
FIG. 5 is a sectional view of the page turning mechanism of our improved selection display system.
Figure 6:
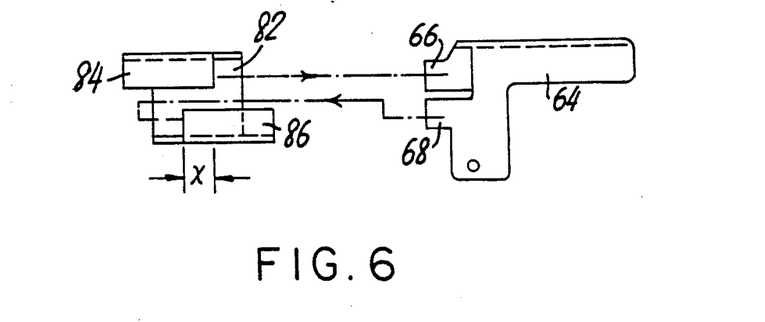
FIG. 6 is a partially schematic view further illustrating the mode of operation of the page turning mechanism of our jukebox display system.

We secure a drive member 82 to the outer end of the bar 72. Member 82 in cross-section has the general shape of a U lying on its side. The upper leg of the member 82 is provided with a downwardly extending upper drive flange 84. The lower leg of the drive member 82 is provided with an upwardly extending lower drive flange 86. The two flanges 84 and 86 overlap for a distance "x" as indicated in FIGS. 4 and 6.

A drive motor 88 provides an input to a gear box 90 having an output shaft 92 carrying a pinion 94 for rotation therewith. Pinion 94 engages rack teeth 96 formed on the left-hand drive bar 70 and rack teeth 98 formed on the right-hand drive bar 72. A handwheel 93 on shaft 92 permits the title page mechanism to be moved manually by service personnel.

Figure 2:
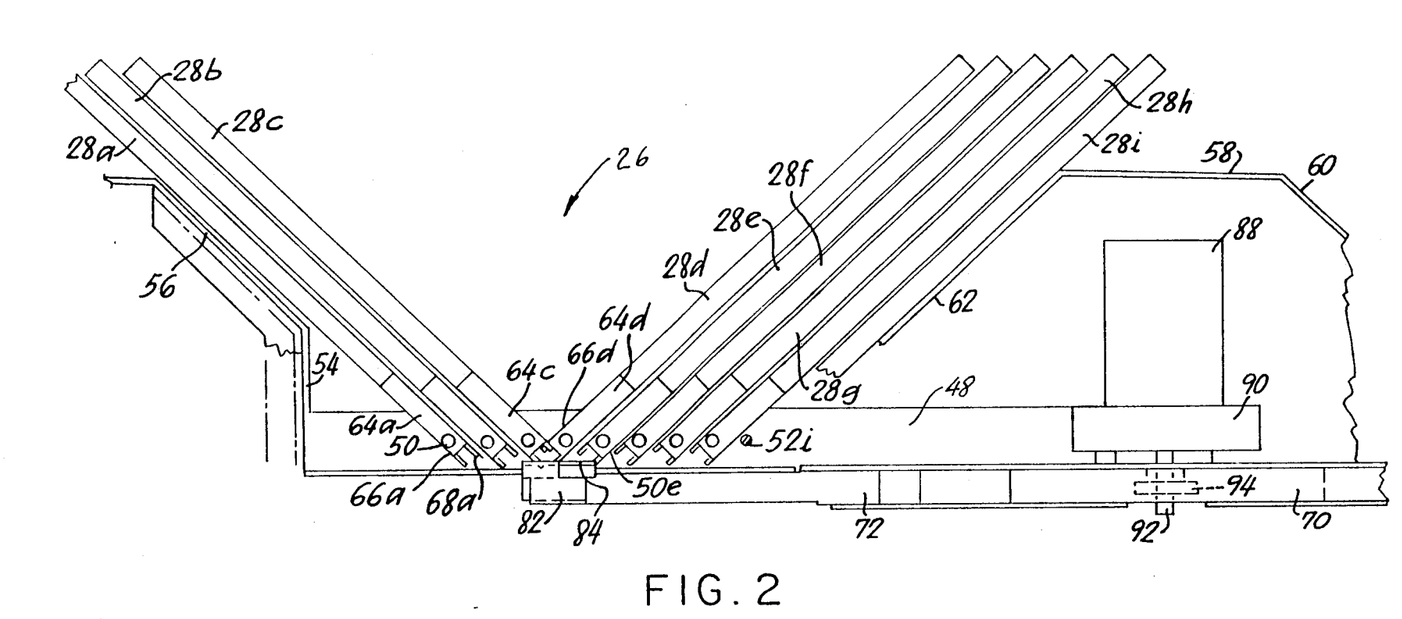
FIG. 2 is a fragmentary view of a portion of our improved selection display system and page turning mechanism therefor.
Figure 3:
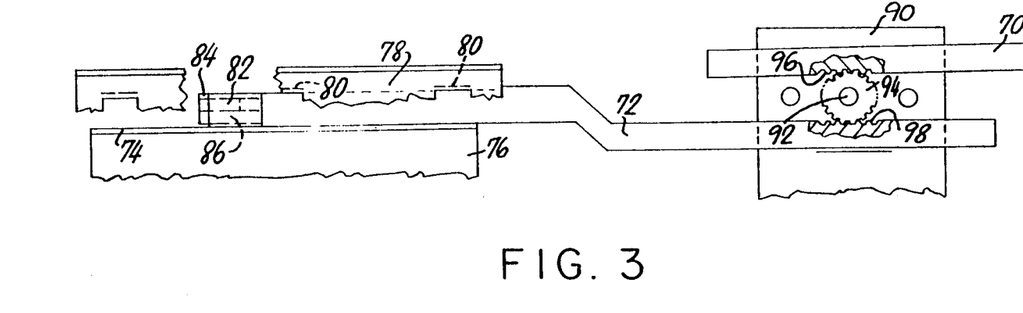
FIG. 3 is an elevation of the portion of our improved display system and page turning mechanism therefor.
Figure 7:
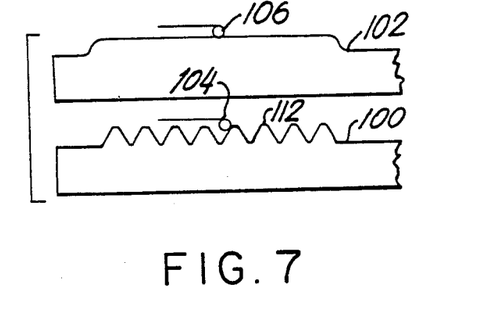
FIG. 7 is a schematic view illustrating our arrangement indicating the present position of the title page display system.

Referring now to FIGS. 2, 3 and 7, the upper surface of bar 70, for example, is formed with respective tracks 100 and 102. Respective switch actuator followers 104 and 106 ride on the tracks 100 and 102 to operate switches 108 and 110. It can be seen that track 100 has a number of nodes or projections 112 equal to the number of panels 28 in each set. Track 102 is continuous over the extent of the series of nodes 112 and drops off at each end to indicate that the page changing mechanism is at the limits of its movement. Switch 108 counts the number of page turnings as the system moves from one of its limits to the other. As will be explained hereinbelow, this information permits the control system to know at all times the condition of the title page mechanism.

Figure 8:
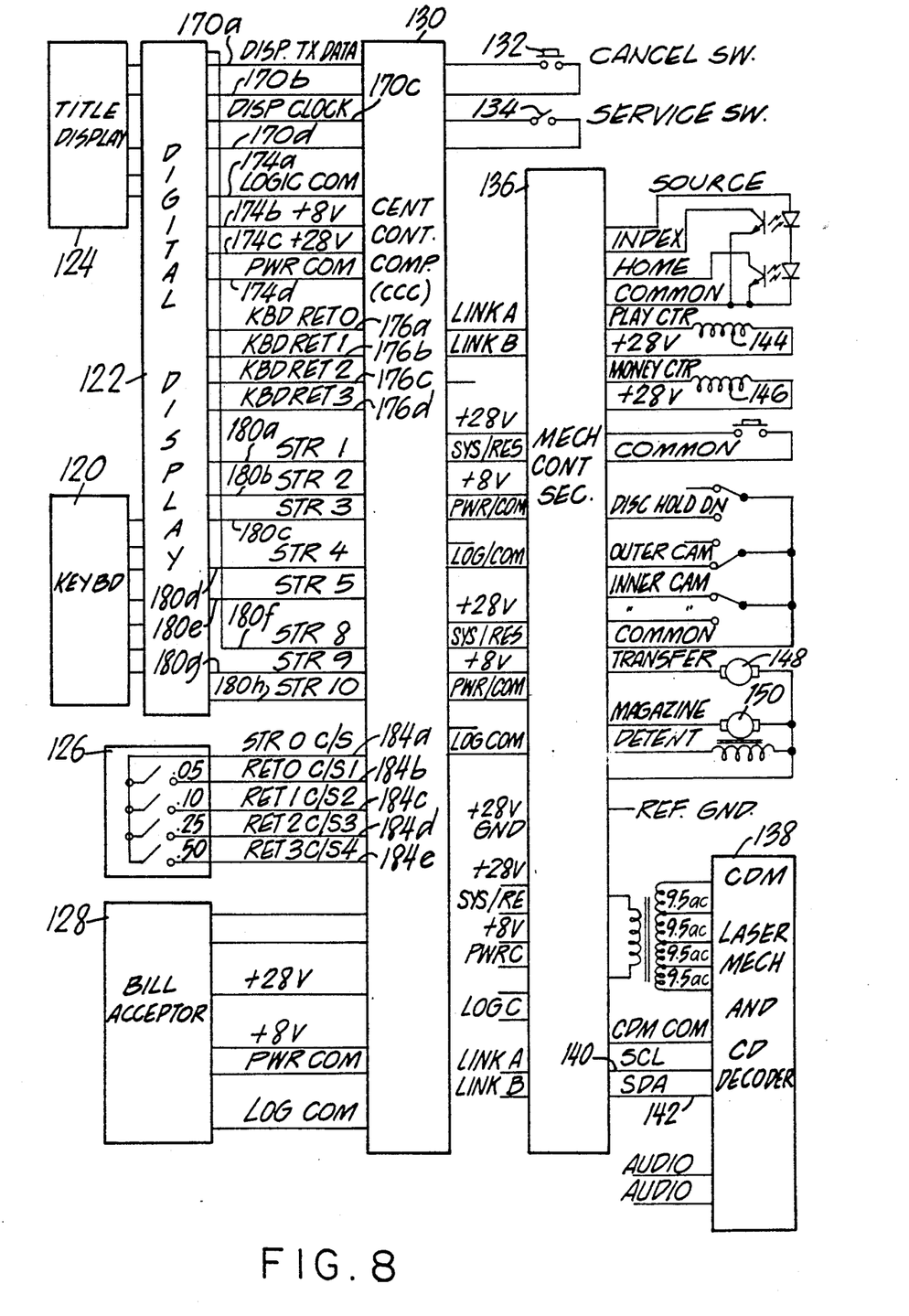
FIG. 8 is a block diagram of one form of microprocessor-based control system which we may use with our improved selection display system.

Referring now to FIG. 8, which is a block diagram of the control system for our title display, the control system includes a keyboard indicated by the block 120, adapted to input information to a digital display system 122. This digital display unit 122 feeds information to and receives information from the title page display unit 124.

A coin mechanism 126, which may for example be responsive to nickels, dimes, quarters and half-dollars, provides monetary input information to the central control computer 130 of the control system.

A bill acceptor 128 which may, for example, accept $1 and $5 bills, provides corresponding credit information to the central control computer 130. As is known in the art, the central control computer 130 accumulates credit information from the coin mechanism 126 and the bill acceptor 128 from which credit is subtracted as selections are played.

The digital display unit 122 provides certain input information to the central control computer and receives information therefrom from which it provides various displays, such for example as the selection being played and other information, as will be described more fully hereinbelow.

The central control computer 130 has associated therewith a cancel switch 132, which may be actuated to cancel a selection, as well as an internally accessible service switch 134 which may be closed to place the unit in a service mode for reasons which will be described more fully hereinbelow.

The central control computer 130 provides the necessary inputs to the mechanism control section 136 of the control system to cause the jukebox to operate in the intended manner. The mechanism control section comunicates with the compact disc mechanism 138 including the laser mechanism and CD decoder over lines 140 and 142.

In addition to communicating with the unit 138, the mechanism control section provides the required signals for other various units of the machine, such for example as the play counter 144, the money counter 146, the transfer motor 148 and the magazine motor 150.

Since most of the functions of the mechanism control section do not per se form a part of our invention, they will not be described in detail. Moreover, since the compact disc laser mechanism and decoder are not per se part of our invention, they likewise will not be described in detail.

Figure 9:
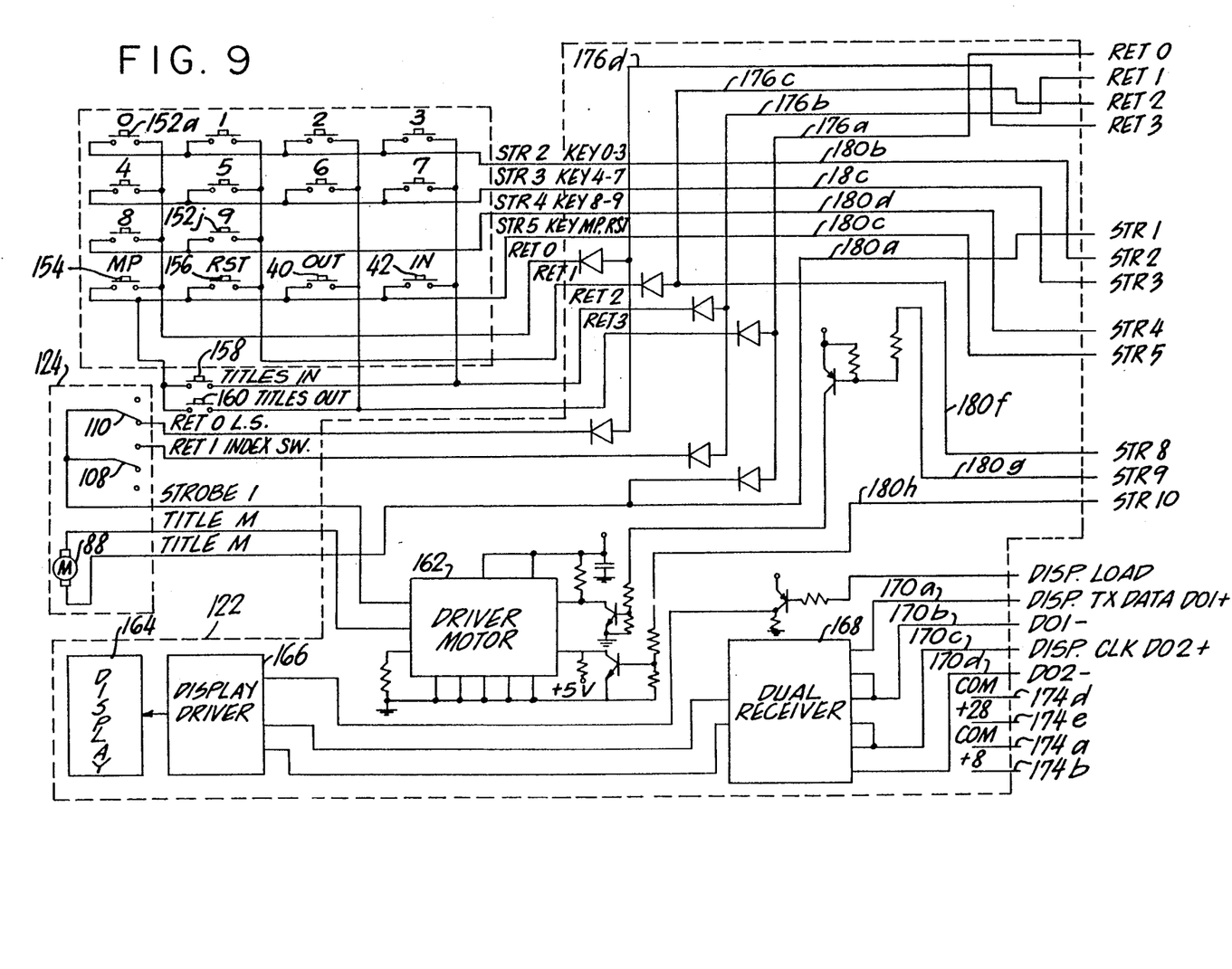
FIG. 9 is a more detailed view of the keyboard, main display, and title display components of the system shown in FIG. 8.

Referring now to FIG. 9, the keyboard assembly 120 which is indicated generally by the reference character 44 in FIG. 1, includes a pushbutton switch 40 adapted to be operated to cause the title pages to flip outwardly and a pushbutton switch 42 adapted to be operated to cause the pages to flip inwardly. In addition, the keyboard 120 includes numeric pushbuttons 152a through 152j which are operated to make selections in the normal operational mode of the machine and which are operated in predetermined sequences in the service mode of the machine. A "most popular" selection switch and a reset switch 156 complete the switches of the keyboard 120. In the service mode, a pair of switches 158 and 160 internal to the jukebox may be operated to cause the titles to move inwardly or outwardly.

The title display unit 124 includes the drive motor 88, the indexing switch 108, and the limit switch 110.

Associated with the title display page unit 124 and indicated as a part of the digital display unit 122, is a motor driver 162 which may for example be a Sprague Electric UDN 2953B. As will be explained more fully hereinbelow, in operation of the system the control circuitry knows the present location and direction of drive of the display system so that proper control is achieved.

The visual display unit 164 may, for example, be a vacuum fluorescent display of any type known to the art which is adapted to provide the extent of display required. Associated with the unit 164, is a display driver 166 which may be a Rockwell International 10937P. A dual receiver 168 which may be a National Semiconductor DS88C20 couples the display data to the driver 166 which, in a manner known to the art actuates the display unit to provide the visible display. We have indicated the nature of the couplings between the digital display section 122 and the central computer 130 to the right in FIG. 9.

Figure 11:
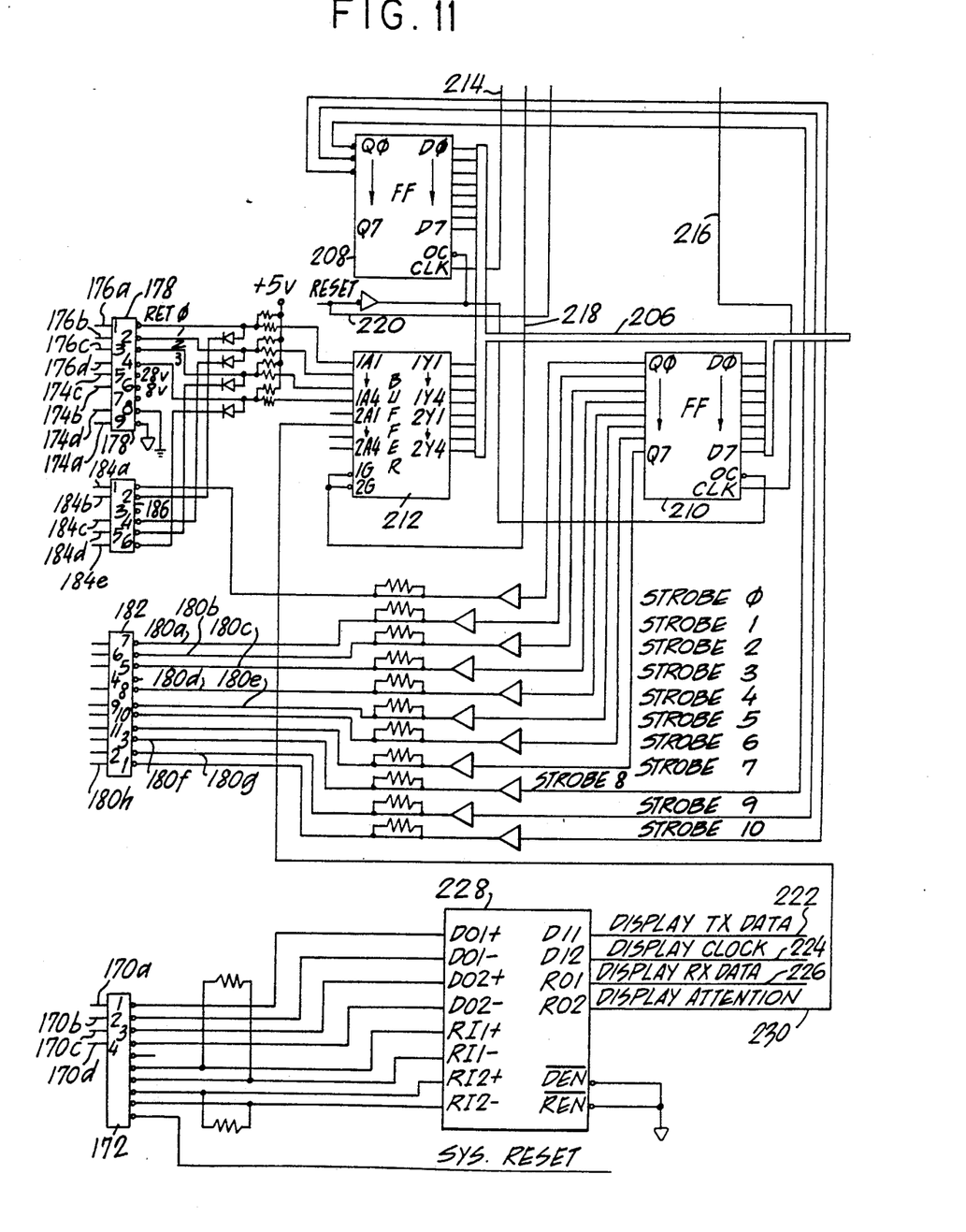
FIG. 11 is a more detailed view of the remainder of the central control computer section of the system shown in FIG. 8.

Referring now to FIGS. 9 and 11, we have indicated the connections between the digital display section 122 and the central control computer 130 in the following manner. The channels indicated by the reference characters 170a and 170b and 170c and 170d correspond to the DISPLAY TX DATA and DISPLAY CLOCK and lead to a terminal element 172 of FIG. 11. A first group of conductors corresponding respectively to the logic common, the +8 volt DC line, the +28 volt DC line and the power common, as well as a group of conductors 176a to 176d, corresponding to the keyboard returns 0 through 3, are coupled to a terminal element 178 of FIG. 11 in the order shown. Conductors 180a through 180h which carry respective strobes 1 to 5 and 8 to 10 lead to a terminal element 182 of FIG. 11. Conductors 184a through 184e which correspond to the 0 strobe for the coin switch, as well as the coin switch returns 0 to 3 are connected to a terminal element 186 of FIG. 11.

Figure 10:
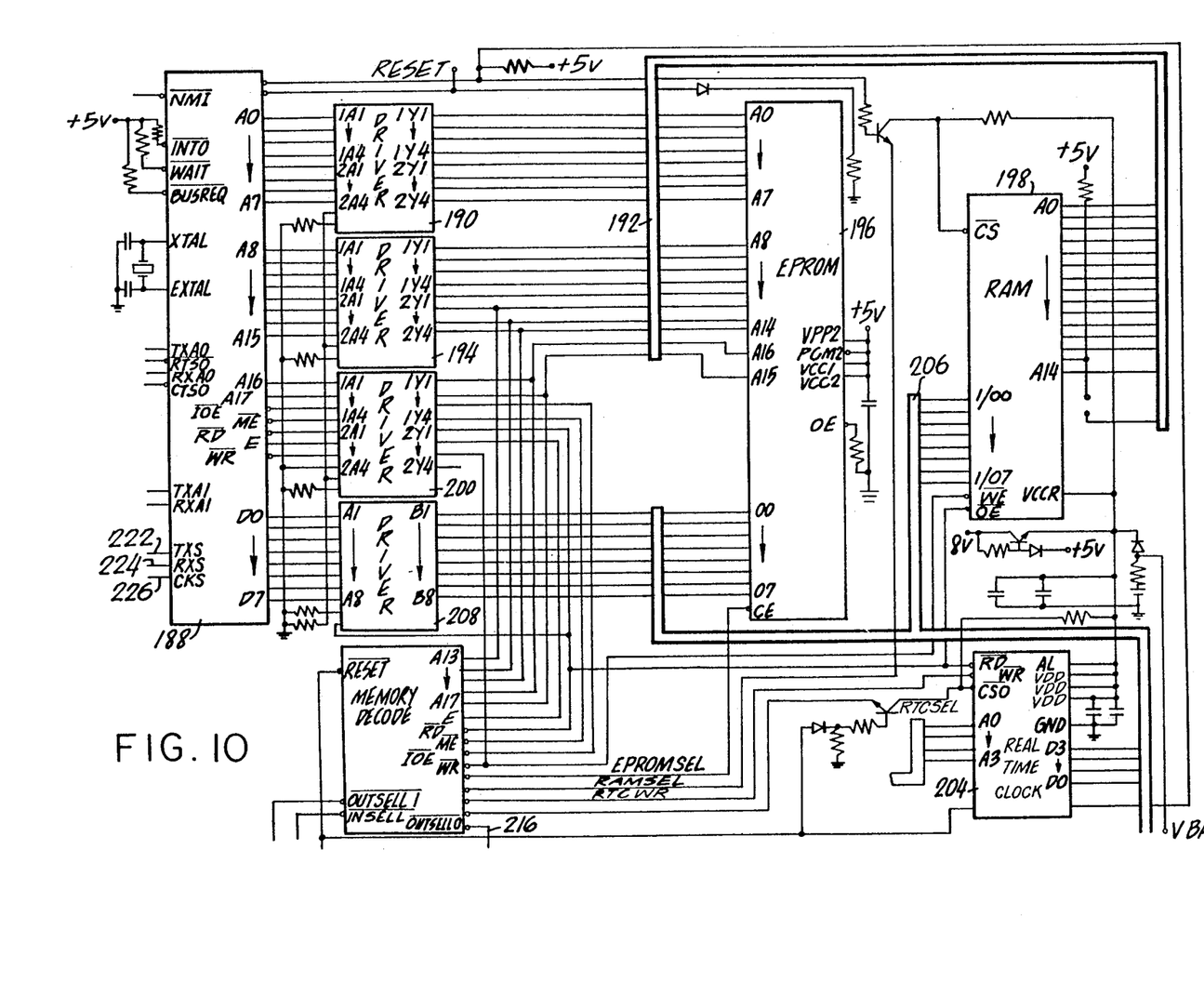
FIG. 10 is a more detailed view of a portion of the central control computer section of the system shown in FIG. 8.

The central control computer 130 includes a microprocessor 188 which may, for example, be a Hitachi 64180. The address output ports A0 through A7 of the microprocessor 188 are coupled to a driver 190 leading to an address bus 192 of the system. Similarly, the output ports A8 through A15 of the microprocessor 188 provide inputs to a second driver 194 which also supplies the >address bus 192. Drivers 190 and 194 may for example be 74HCT244 drivers. The address bus 192 provides input data for an EPROM 196 such as a 27512 and a RAM 198 such as a 6264-12. A third driver 200 which may also be a 74HCT244 provides two more address bits as well as command signals to a memory decoding matrix 202 which may for example be a 18P8 and to a calendar clock 204 which may be for example a 72421.

As is known in the art, in response to actuation the EPROM and the RAM are adapted to put out data on a data bus 206. Another driver 208 which may be a 74HCT245 couples the databus 206 to the D0 to D7 terminals of the microprocessor 188. Databus 206 is coupled to the D0 to D7 inputs of each of a pair of flip-flops 208 and 210 shown in FIG. 11, which flip-flops may for example be 74LS374 flip-flops. We also couple the databus 206 to the terminals 1Y1 to 1Y4 and 2Y1 to 2Y4 of a buffer 212 which may be a 74HC244. A conductor 214 connects the OUT SEL 1 to the clock input terminal of the flip-flop 208 which provides output strobes 8 to 10 leading to the terminal 182.

Another conductor 216 connects the OUT SEL 0 of the decoder 202 to the clock input terminal of the flip-flop 210 which provides strobes 0 through 7 associated with the terminal 182.

A conductor 218 connects the IN SEL terminal of the decoder 202 to the buffer 212 which is associated with terminals 178 and 186.

Respective conductors 222, 224 and 226 connect the TXS RXS and CKS ports of the microprocessor 188 to the D11, D12 and R01 inputs of the circuit component 228 which may for example be a DS8923 associated with the terminal 172 to control the title page display. A conductor 230 connects the 282 terminal of the component 212 to the R02 input of the component 228 to cause the display to operate in the "Attention" mode.

The mechanical operation of our page turning mechanism is best understood by reference to FIGS. 4 and 6. When the driver 82 moves to the right, as viewed in FIG. 4, the lower drive flange 86 engages the lower tooth 68d to cause the panel 18d to pivot in a counter-clockwise direction, as viewed in FIG. 4, around the axis of pin 50d. Conversely, when the drive member moves to the left, as viewed in FIG. 4, the upper drive flange 84 engages the tooth 66c of panel 28c to cause it to pivot in a clockwise direction about the axis of pin 50c.

In addition to performing the driving function described immediately hereinabove, in the quiescent condition of the apparatus the member 82 performs a locking function. In the absence of any energization of the motor 88, if an attempt is made to move the panel 28d in a counterclockwise direction around the axis of pin 50d, as viewed in FIG. 4, tooth 66d engages flange 84 to inhibit such movement. Similarly, if an attempt is made to move the panel 28c in a clockwise direction around the axis of pin 50c, as viewed in FIG. 4, tooth 68c engages flange 86c to inhibit this movement.

As has been pointed out hereinabove, our arrangement enables us to provide a relatively high torque for turning the panels without increasing the distance d between the pivotal axes of a pair of adjacent panels. In turning the panel 28c in a clockwise direction, as viewed in FIG. 4, the flange 84 first engages the tooth 66c at a point p to provide an initial lever arm of length 1 between point p and the axis of pin 50c. With our arrangement of upper and lower teeth 66 and 68 and upper and lower drive flanges 84 and 86, we are able to make the distance 1 greater than half the distance d between the pivotal axis of a pair of adjacent panels 28.

In effect, our arrangement can be viewed as a two tooth gear including teeth 66 and 68 on the panel 28 cooperating with a single tooth gear formed by the overlapping portions of flanges 84 and 86.

In the normal operation of the system, the customer may change the page or panel being displayed merely by pushing one of the buttons 40 or 42 in the keyboard 44 on the front of the machine. For example, if the button 40 is pushed the pages move in one direction while pushing of button 42 results in movement of the pages in the other direction. In either direction of movement each actuation of one of the buttons 40 or 42 results in turning of only one page of each set. Whenever power to the phonograph is interrupted or after the title page has been changed by use of the handwheel 83, the title pages must be resynchronized. To accomplish this result, either of the two page change buttons 40 or 42 is actuated repeatedly until the pages no longer change. When that has been done the other page change button 42 or 40 is actuated repeatedly until the pages again no longer change. At this point the computer will know the location of the page change mechanism.

When a customer desires to make a selection he finds the selection he wants by moving the keyboard in and out switches 40 and 42. When this is done, the central control computer 130 sends out strobes 1, 9 and 10 to the digital display unit 122. The motor 162 in the digital display unit 122 uses strobe 9 to control the speed and strobe 10 to control the direction. The central control computer 130 determines when to stop the motor after a panel has fully flipped by sensing the state of the index switch 110 on the index switch return RET 1. The central control computer 130 determines when to change direction of the page change by sensing the state of the limit switch 108 on the limit switch return RET 0. In order to enter his selection a customer presses four digits, each of the switches 152a through 152j. The computer 130 determines the switches which have been pushed by sending out strobes 2, 3, 4 and 5 and then sensing RET 0, 1, 2 and 3 associated with the switches 152a to j. When this has been done, the digital display 164 shows the digits as they are entered above the legend "SELECTION BEING MADE". This selection is stored in the computer memory, credit is cancelled and the selection is displayed for approximately four seconds after it has been made.

When all of the selections have been made and the jukebox is in a quiescent state, the page turning mechanism may operate in either the "attract" mode or the "change" mode to which it may have been set in a manner to be described hereinbelow.

Figure 12:
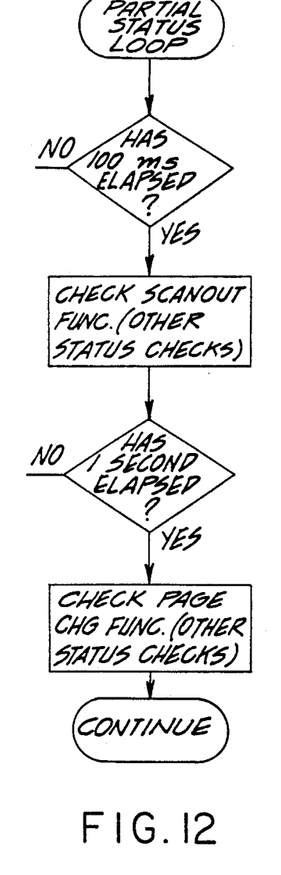
FIG. 12 is a flow diagram of a partial status check performed prior to entering the page change function.
Figure 13:
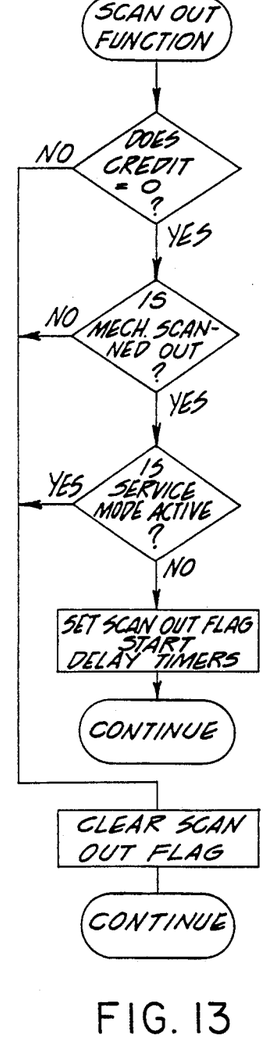
FIG. 13 is a flow diagram of the scan out function performed prior to entering the page change function.
Figure 14:
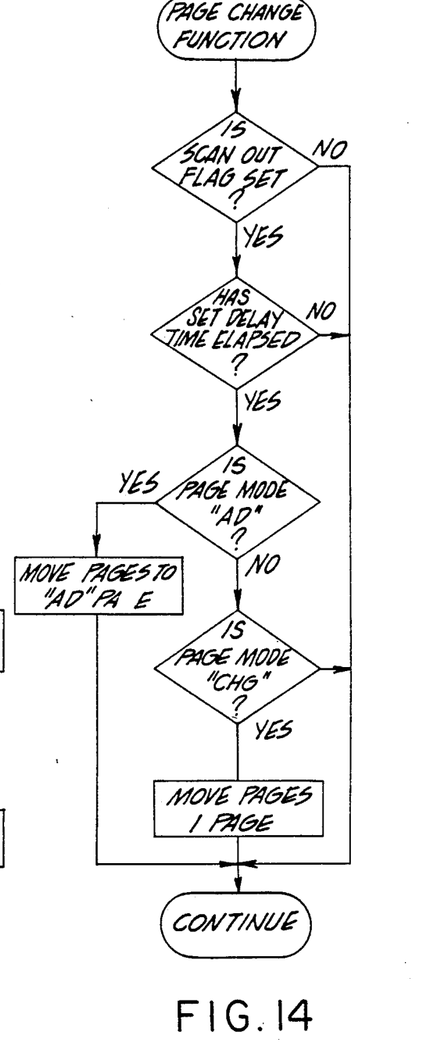
FIG. 14 is a flow diagram of the page change function of our title page display system.

Referring to FIGS. 12 to 14, the computer first goes through a partial status loop as indicated in FIG. 12. A determination first is made whether or not 100 milliseconds has elapsed. If so, the scan out function is checked, other status checks are made and a determination is made as to whether or not one second has elapsed. If so, the page change function is checked, other status checks are made and the computer continues.

Referring to FIG. 13, in performing the scan out function a determination first is made as to whether the credit is zero. If not, the scan out flag is cleared and the system continues. If so, a check is made as to whether or not the mechanism is scanned out. If not, the scan out flag is cleared and the system continues. If so, a determination is made as to whether or not the apparatus is in the service mode. If so, the scan out flag is cleared and it continues in the service mode. If it is not in the service mode, the scan out flag is set and the delay timers are started.

Referring now to FIG. 14, in the page change function the system first determines whether or not the scan out flag is set. If not, it continues. If so, it determines whether or not the set delay time has elapsed. If not, the system continues. If the set delay time has elapsed, a check is made to see if the page mode is "AD". If so, the pages are moved until the "AD" page or pages are displayed. If the system has not been set in the "AD" mode, a check is made to see if it has been set in the "CHANGE" mode. If so, the page changing apparatus operates to move the pages through the extent of one page at predetermined intervals.

We provide our control system with means for setting the title page changing mechanism as well as the mode of operation of the same. First, it may be that the machine operator does not require the full number of pages available to display the number of titles which will be placed in the machine. If so, the apparatus is settable to restrict the page movement to just those pages which have titles. In order to achieve this result the cabinet top door is open to permit access to the service switch 134. This switch is closed and the legend "SERVICE MODE" will appear on the display. Next, "0" button 152a is pressed to select the SECURITY submenu. This button is again pressed four more times to enter the factory code setting. Popular button 154 is pressed to display the current security level. Next, the reset button 156 is pressed and held while button 154 is pressed twice to display again "SERVICE MODE" on the display 164.

Button 152c corresponding to the digit "2" is pressed to select that portion of the control menu relating to title page changes. Button 152e is pushed to select the PAGE LIMIT function. Starting from left to right the first page number is typed and popular button 154 is pressed. Next, the last page number to be used is typed and the popular button is again pressed. The first and last pages of the title display which can be shown will now be displayed.

In a manner analogous to that discussed hereinabove in connection with the setting of limits for the title page control mechanism, the mode of operation as well as the characteristics thereof may be set. For example, to set the title page display system in the "ATTRACT" mode, one first presses the key 152c corresponding to the digit "2" and then the key 152a corresponding to "0". When that has been done, the reset button 156 is held down and button 152j corresponding to the digit "9" is pressed to toggle the attract mode on and off. Next, the popular button 154 is pushed to preserve this setting.

The "AD" mode of the title page display may be set by first pushing button 152c followed by button 152b corresponding to the digit "1". Holding the reset button 156 down, 152j is operated to set the page change mode on or off. When that has been done, the button 154 is pushed to preserve the change.

A time interval between page changes is set by pressing button 152c twice, typing the new time in minutes on the keyboard and then pushing the popular button 154.

To change the particular page which is to be displayed in the "AD" mode, buttons 152c and 152d are sequentially pressed, the new page number is typed in and then popular button 154 is pushed.

We provide our system with means for changing the speed at which the title pages are changed. We set up our system so that one speed can be used for the normal operation of the jukebox and a second speed for the service mode. For another speed change, buttons 152c and 152f are pressed. Next, one of the buttons 152a through 152j is pushed. The popular button 154 is operated to set the page change speed for normal operation of the machine. When that has been done, another operation of one of the buttons 152a to 152j followed by an operation of button 154 sets the service mode speed change.

It will be seen that we have accomplished the objects of our invention. We have provided an improved jukebox display system made up of a number of relatively large pages visible from the front of the jukebox and containing pictorial as well as descriptive information. Our system includes a page turning mechanism which generates sufficient torque to turn relatively large pages while at the same time not requiring an excessive distance between adjacent page pivots. We have provided means for automatically turning pages at predetermined intervals. We have made provision for setting the limits of movement of the page changing mechanism, as well as the interval between page changes. Our system may be set to turn to a particular page in its quiescent condition. We may set the mechanism to change pages at one speed in its normal operating mode and at another speed in the service mode. Our arrangement is especially adapted for use with a jukebox which plays compact discs. Our display is attention getting and interest arousing. The page turning mechanism of our display is relatively simple for the result achieved thereby.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A jukebox selection display system including in combination a jukebox cabinet, a window in said cabinet, a plurality of pages each containing graphic and alpha-numeric information relating to one or more selections, means mounting said pages within said cabinet behind said window for movement from a first position at which at least one of said pages is visible to a prospective customer while other pages are concealed to a second position at which at least one other of said pages is visible, means including a motor adapted to be energized to move said pages, customer operable means accessible externally of said cabinet for energizing said motor to move said pages and automatic control means comprising a micrprocessor for automatically energizing said motor independently of the operation of said customer operable means to move said pages at a predetermined time after the last movement of said pages in response to operation of said customer operable means.

2. A jukebox selection display system as in claim 1 in which said automatic control means comprises means for automatically energizing said motor to move said pages sequentially into view at predetermined intervals.

3. A jukebox selection display system as in claim 2 including means for changing the interval at which said pages are moved sequentially into view.

4. A jukebox selection display system as in claim 1 in which said automatic control means comprises means for automatically energizing said motor to move a particular page into view and to leave said particular page in view until the next operation of said customer operable means.

5. A jukebox selection display system as in claim 1 in which said automatic control means has a first mode in which said pages are moved sequentially into view at predetermined intervals and a second mode in which a particular page is moved into view and left in view until the next operation of said customer-operable means and means for setting said automatic control means into one of said modes.

6. A jukebox selection display system as in claim 5 including means for changing said particular page and means for changing the time interval at which said pages are moved successively into view.

7. A jukebox selection display system as in claim 1 in which said control means is settable in a normal mode and inn a service mode, said customer operable means moving said pages at a first speed in the normal mode and means operable in the service mode of said control means for moving said pages at a second speed which is different from said first speed.

8. A jukebox selection display system as in claim 1 including means for setting said first and second speeds.

9. A jukebox selection display system as in claim 1 including means for limiting the operation of said means to move said pages to less than the number of pages making up said plurality and means for setting said limiting means.

10. A selection display assembly for a jukebox including in combination a free-standing full-size jukebox cabinet for housing the records and playing mechanism of the jukebox, said cabinet having a front provided with a window, said front being formed with a recessed display area extending across the width of the cabinet at a location behind said window at which it is readily visible to prospective customers, a plurality of selection display panels, a plurality of selection displays on each of said panels, each of said displays being a full size compact disc cover jacket, means mounting said panels in said display area for movement from a first position at which at least one of said panels is visible to a prospective customer to a second position at which at least one other of said panels is visible to said prospective customer, means comprising a motor adapted to be energized to move said panels, customer operable means accessible externally of said cabinet for energizing said motor to move said panels and automatic control means comprising a microprocessor for automatically energizing said motor independently of the operation of said customer operable means to move said panels at a predetermined time following the last movement of said panels in response to operation of said customer operable means.

11. A selection display system as in claim 10 in which said automatic control mans comprises means for automatically energizing said motor to move said panels sequentially into view at predetermined intervals.

12. A selection display system as in claim 10 in which said automatic control means comprises means for automatically energizing said motor to move a particular panel into view and to leave said particular panel in view until the next operation of said customer operable means.

13. A selection display system as in claim 10 in which said automatic control means has a first mode in which said panels are moved sequentially into view at predetermined intervals and a second mode in which a particular panel is moved into view and left in view until the next operation of said customer operable means and means for setting said automatic control means into one of said modes.

14. A selection display system for a jukebox including in combination a free-standing full size jukebox cabinet for housing the records and playing mechanism of the jukebox, said cabinet having a front provided with a window, said front being formed with a recessed display area extending across the width of said cabinet at a location behind said window at which it is readily visible to potential customers, a first plurality of selection display panels, means mounting the panels of said first plurality of selection display panels at one side of said display area for pivotal movement around generally vertical axes inclined rearwardly from bottom to top thereof, a second plurality of selection display panels, means mounting the panels of said second plurality of selection display panels at the other side of said display area for pivotal movement around generally vertical axes inclined rearwardly from bottom to top thereof whereby said pluralities of panels are side by side, common drive means inn said cabinet, said common drive means comprising an energizable motor and a mechanical linkage connecting said motor to the panels of both of said pluralities for turning inn sequence the panels of both of said pluralities and customer operable means accessible externally of said cabinet for energizing said motor to cause said drive means concomitantly to move the panels of both of said pluralities sequentially into view.

15. A selection display system as in claim 14 in which each side of the inner panels and the inner sides of the outer panels of each plurality each carries a plurality of selection displays, each of which is a full size compact disc cover jacket.

16. A selection display system as in claim 15 in which each of said sides carries three selection displays whereby twelve selections are visible at any one time.

17. A selection display system as in claim 14 in which said drive means turns the panels of said displays in opposite directions.

18. A selection display system as in claim 14 in which said drive means comprises vertically offset upper and lower parallel teeth extending rearwardly from the respective sides of each panel, the teeth of adjacent panels being at corresponding vertical locations, respective drivers associated with said pluralities of panels, means mounting each driver for movement along a path generally transverse to the vertical axes of its associated plurality, each of said drivers being formed with first and second surfaces for respectively engaging said upper teeth and said lower teeth of the panels of its associated plurality in response to movement of the driver in opposite directions along said path, thus to turn said panels.

19. A selection display system as in claim 14 including control means comprising means for automatically moving the panels of said pluralities sequentially to bring the sides thereof into view at predetermined intervals at a set time following the last operation of said externally accessible means.

20. A selection display system as in claim 14 including control means for automatically moving said panels to move particular sides thereof into view at a set time following the last operation of said externally accessible means and for leaving said particular side sin view until the next operation of said externally accessible means.

21. A selection display assembly for a jukebox including in combination, a housing having a window, a first group of panels, a second group of panels, intelligible representations of the respective sides of each of said panels of an available jukebox selection, means mounting the panels of said first group in said housing behind said window for pivotal movement to positions at which respective sides of adjacent panels of said first group are visible to a prospective customer, means mounting the panels of said second group in said housing behind said window at a location adjacent to the panels of said first group for pivotal movement to positions at which respective sides of adjacent panels of said second group are visible to a prospective customer whereby four sides of said panels are simultaneously displayed to said customer, common drive means in said housing comprising a motor adapted to be energized and a mechanical linkage connecting said motor to the panels of booth of said pluralities concomitantly to pivot the panels of both of said first said second groups in sequence to change said display to four different sides of said panels and customer operable means accessible externally of said housing for energizing said motor to turn the panels of both groups sequentially in unison.

22. An assembly as in claim 21 in which each of said panels is large enough to accommodate three compact disc jackets on a side thereof.

23. An assembly as in claim 21 in which said pivoting means comprises respective racks associated with said groups and a common drive pinion engaging said racks.

24. An assembly as in claim 21 in which said panels are mounted for movement around generally vertical axes which are inclined slightly rearwardly from bottom to top whereby gravity assists in completing the pivotal movement of a page.

25. An assembly as in claim 21 including a backing member for the panels of said sets against which said panels rest when stationary, the configuration of said member being such that open panels form an angle of approximately 90°.

26. A selection display assembly as in claim 21 including customer operable means for actuating said panel pivoting means and control means comprising means for automatically actuating said panel pivoting means at a set time after the last operation of said customer operable means sequentially to move the sides of said panels to positions at which said sides are visible.

27. A selection display assembly as in claim 21 including customer operable means for actuating said panel pivoting means at set time after the last operation of said customer operable means to move said panels to specific positions at which particular sides thereof are visible and for leaving said panels in said specific positions until the next operation of said customer operable means.

* * * * *

UNITED STATES PATENT AND TRADEMARK OFFICE
CERTIFICATE OF CORRECTION

PATENT NO. : 5,031,346

DATED : July 16, 1991

INVENTOR(S) : Herring et al

It is certified that error appears in the above-identified patent and that said Letters Patent is hereby corrected as shown below:

```
Claim 1, col. 9, line 60, change "micrprocessor"
          to --microprocessor--.
Claim 7, col. 10, line 24, change "inn" to --in--.
Claim 8, col. 10, line 29, change "1" to --7--.
Claim 11, col. 10, line 62, change "mans" to --means--.
Claim 14, col. 11, line 29, change "inn" to --in--.
Claim 14, col. 11, line 32, change  "inn" to --in--.
Claim 20, col. 12, line 8, change "side sin" to
          --sides in--.
Claim 21, col. 12, line 28, change "booth" to --both--.
```

Signed and Sealed this

Twentieth Day of October, 1992

*Attest:*

DOUGLAS B. COMER

*Attesting Officer*     Acting Commissioner of Patents and Trademarks